April 10, 1951 R. C. IRONS 2,548,798
CABBAGE WASHING AND STRIPPING MACHINE
Filed Feb. 5, 1947 2 Sheets-Sheet 1

INVENTOR.
Ross C. Irons,
deceased,
BY Roy Irons, administrator
ATTORNEY

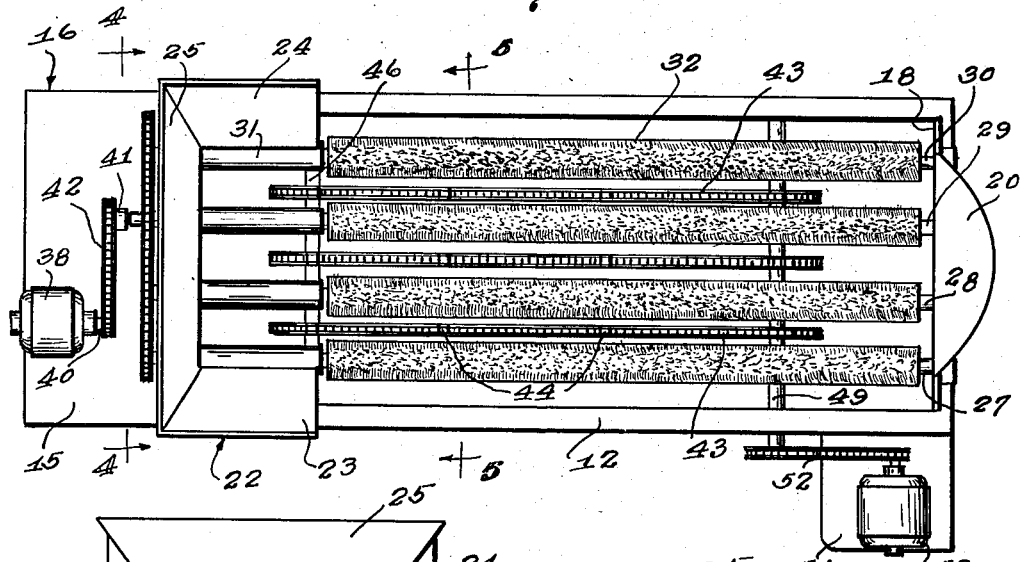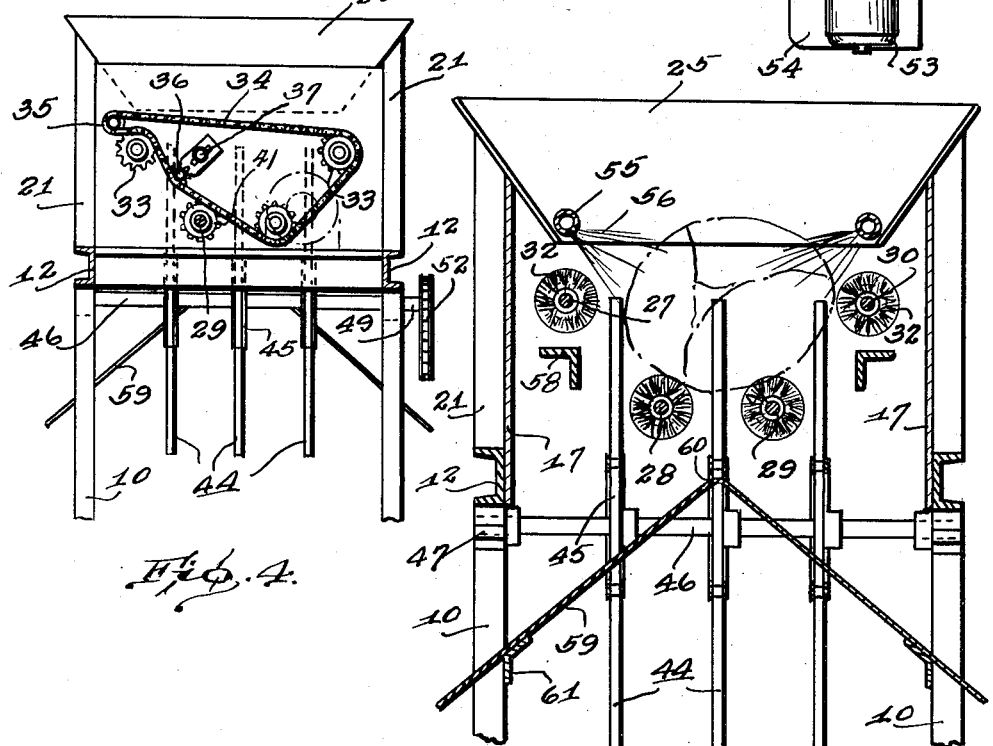

Patented Apr. 10, 1951

2,548,798

UNITED STATES PATENT OFFICE 2,548,798

CABBAGE WASHING AND STRIPPING MACHINE

Ross C. Irons, deceased, late of Bellevue, Ohio, by Roy Irons, administrator, Clyde, Ohio, assignor, by mesne assignments, to The Fremont Kraut Company, Fremont, Ohio, a corporation of Ohio Application February 5, 1947, Serial No. 726,571

2 Claims. (Cl. 146—50)

This invention relates to a machine for preparing ball-like varieties of fruits and vegetables and it is particularly suitable for stripping and washing headed varieties of leafy vegetables such for example as cabbage and head lettuce.

An object of the invention is to produce a new and improved machine for preparing and cleaning fruits and vegetables substantially as received from the farms.

Another object is to produce a machine for preparing ball-like varieties of fruits and vegetables for subsequent use by removing the outer soiled or damaged surfaces and washing the remainder of the produce.

A further object of the invention is to produce a machine which is self-cleaning and operates by itself to remove the outer leaves and wash headed varieties of leafy fruits and vegetables during their passage through the machine singly or in continuous procession.

Other objects and advantages of the invention will become apparent from the following description and claims and for purposes of illustration but not of limitation, an embodiment of the invention is shown in the accompanying drawings, in which Figure 1 is a side elevational view of a stripping and washing machine with the side walls omitted more clearly to illustrate the working parts of the machine;

Figure 3 is a top plan view of the machine with the feed hopper and associated structure as well as the sprinklers omitted for purposes of clarity in illustration;

Figure 4 is a front and elevational view taken in section along the line 4—4 of Figure 3; and Figure 5 is an enlarged sectional elevational view taken along the line 5—5 of Figure 3 but showing in addition the hopper and sprinklers omitted from Figure 3.

Figure 1:
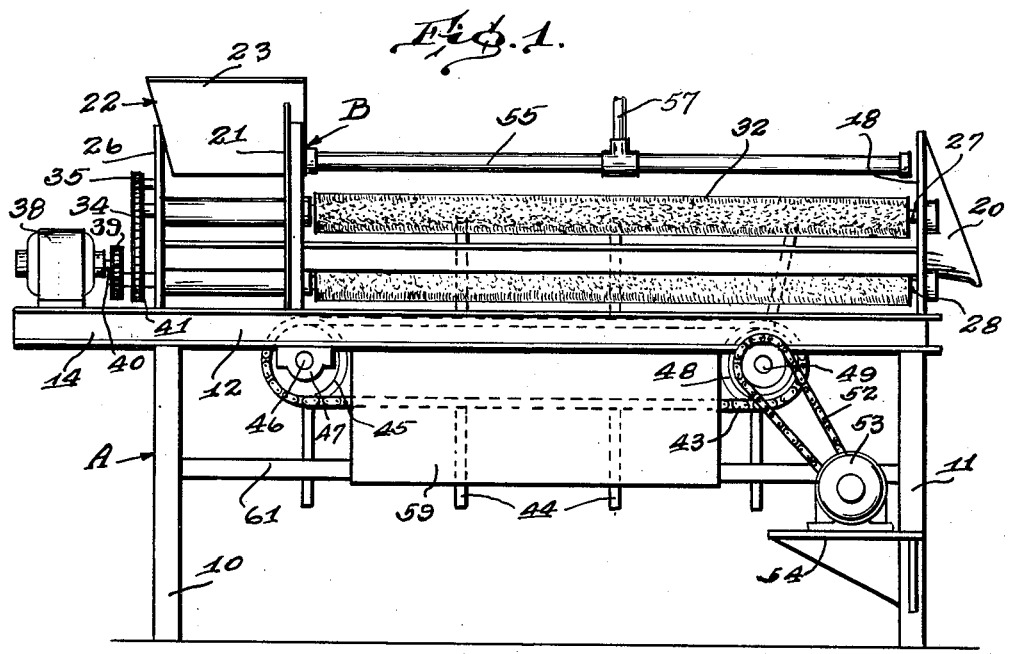
Figure 2:
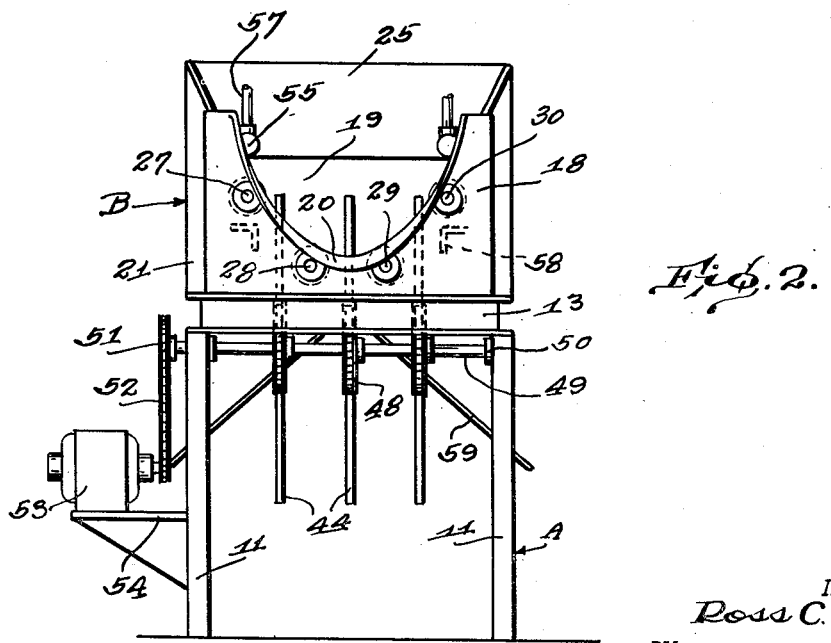
Figure 2 is a rear and elevational view of the machine illustrated in Figure 1.

In the drawings, there is illustrated a machine for preparing fruits and vegetables for subsequent use, consisting of a supporting frame A on which a processing section B is mounted. Although the machine may be used for preparing any fairly large headed, melon, or other ball-like varieties of fruits and vegetables, it is particularly adapted for the removal of the outer or waste leaves of the headed varieties of leafy vegetables and the description will be directed to its operation in connection with cabbage heads.

The supporting frame A is formed of a pair of laterally spaced forward and rearward upright legs 10 and 11 respectively. The legs 10 and 11 are joined longitudinally by horizontal beams 12 and transversely by a channel member 13. The end portions 14 of the beams 12, which extend forwardly of the front legs 10, support a cross plate 15 to provide a platform 16.

The processing section is enclosed laterally by upright side walls 17 which attach at their lower edge portion to the inner faces of the beams 12. The rear or delivery end is partially closed by an upright end plate 18 that engages the rear edges of the side walls 17 and is formed with an arcuate recess 19 to provide an open gateway. A downwardly inclined chute 20 integral with the peripheral edge of the recessed portion 19 operates to receive the prepared heads from the processing elements and deliver them to a subsequent station.

The side walls 17 are engaged at their forward edges by upright supporting members 21 which support the rearward portion of a feed hopper 22. This feed hopper is formed in the usual manner of downwardly and inwardly inclined side plates 23 and 24 and an inclined front plate 25; the usual rear plate being omitted to enable free movement in that direction of the cabbage heads from the hopper. The hopper, which is also open at the bottom, is supported along its forward wall 25 by an upright end plate 26 that rests upon the platform 16.

Four laterally spaced horizontal shafts 27, 28, 29, and 30 are longitudinally disposed between the end plates 18 and 26 in which the respective end portion of the shafts are journaled. The two intermediate shafts 28 and 29 are arranged in a horizontal row a short distance below, but in substantial parallel relation with the two outer shafts 27 and 30. The portion of each shaft that lies within the area of the feed end of the machine is housed in a protective sleeving 31 which may rotate independently of the shaft, while that portion of each shaft which extends throughout the processing section B is provided with a bristled jacket 32 to form a cylindrical brush. The lateral spacing between shafts is determined by the size of the heads processed; it being desirable to have the heads ride on the upper surfaces of the brushes and not to pass therebetween into the discard.

In operative engagement with the forward end portion of the shaft 29 and the forward ends of the other shafts, all of which extend through the end plate 26, are sprockets 33. A sprocket chain 34, common to all of the sprockets, engages the sprockets in a manner to effect rotation of one pair of adjacent upper and lower shafts in the clockwise direction and the other pair of shafts in the counterclockwise direction. A separate rotatable gear 35 is mounted on the outer wall of the plate 26 to aid in positioning the sprocket chain 34 and another rotatable gear 36 fixed to a slotted plate 37, adjustably mounted on the outer face of the same plate 26, engages the chain 34 between a pair of sprocket gears 33. Manifestly the adjustable sprocket 36 serves as a tightener for the chain 34. This latter gear is used to tension the chain 34 in the mounted position or to release the chain for purposes of dismounting.

Mounted on the platform 16 is a variable speed motor 38 that has a sprocket 39 on the end of its spindle 40. The sprocket is operatively connected to another sprocket 41 on the end of the shaft 29 by a sprocket chain 42. As connected, the motor 39 operates to drive the shaft 29 which, in turn, through chain 34, causes the outer shafts to rotate in the desired direction.

As disclosed, the side walls 17 and the end plates 18 and 26 define an enclosure, which is open at the top and bottom. Within this enclosure, the brushes 32 are longitudinally disposed and below these brushes are three laterally spaced endless chains 43 mounted for movement longitudinally in the area that is in vertical alignment with the space between adjacent brushes. A series of spaced rigid pusher rods 44 are suitably secured at their lower ends to each of the chains 43 and extend perpendicularly therefrom outwardly from spaced apart links along the lengths of each chain. The pusher rods 44 which are on the upper flight of chains are adapted to project into the area between, and even beyond the brushes, and serve to dislodge heads of cabbage from the hopper section and propel them rearwardly through the processing area.

The flights of endless chains 43 are guided at their forward pivot by pulleys 45 fixed to a transverse shaft 46 rotatably mounted at its ends in bearing members 47 secured to the underside of the beams 12. The other pivot of the chains 43 is made in connection with sprockets 48 fixed to spaced apart portions of a rotatable drive shaft 49. The drive shaft is mounted transversely in the rearward portion of the machine by a pair of bearing brackets 50 secured to the underside of the beams 12. Another sprocket 51 operatively secured to an extending end portion of the shaft 49 is engaged by a sprocket chain 52 that transmits motive power thereto from a variable speed motor 53. A platform 54, mounted on the adjacent supporting leg 11, supports the motor 53 in position of use.

In close proximity and above each of the outer brushes 32, there is provided a longitudinally aligned header 55 having a series of openings arranged to direct a spray 56 of water and the like onto the brushes and heads of cabbage as they pass through the processing area. The water is supplied to the headers 55 from overhead pipes 57. In close proximity and below each of the outer and upper brushes is an aligned angle iron or stripper plate 58, which operates in the nature of a picker by means of which the loose cabbage leaves are removed from the brushes. The angle irons 58 may be supported by the machine frame in any desired manner. This keeps the brushes clean so that they are better able to serve the purpose for which they are intended.

The continuous spray of water not only aids in the removal of the outer leaves and the cleansing of the heads of cabbage, but it constantly washes the displaced dirt and leaves from the processing section. The lower flight of chains 43 and the underside of the machine are protected from this waste material by an inverted V-shaped roof or shield 59 of sheet metal having its apex 60 below the upper flight of chains 43 and extending along a line defined by the longitudinal center of the machine. The roof 59 is supported by brace members 61 secured at its ends to legs 10 and 11.

In normal operation, a load of cabbage, as received from the field, is placed in the hopper 22. These heads rest on the sleeving 31 until a pusher rod 44 rises up in their midst and displaces one or more heads from the group. The rods thereafter propel the displaced heads of cabbage rearwardly through the processing area. While in this area, the brushes 32, which rotate as described in the direction to lift the heads upwardly and outwardly against the forces of gravity, strip some of the engaged leaves from the heads. The spray of water plays upon the heads and brushes to aid in the removal of leaves and dirt and to wash the discard from the machine.

The rate of rotation of the brushes 32 and the longitudinal speed of movement of the pusher rods 44 may be regulated to effect the removal of the desired amount of outer leaves from the head. Since the leaves are formed in overlapping superposed relation, it is obvious that all of the leaves cannot be stripped immediately, but to the contrary, the removal ordinarily is at a rate which enables relatively accurate regulation of the amount removed. The stiffness of the bristles can also be controlled to operate in a manner to strip the leaves or, in a milder manner, to dislodge the leaves and brush the surfaces of the head for cleansing purposes.

The delivery opening 19 or gateway in the rear plate 18 is arranged with its peripheral edge in substantial alignment with the surfaces of the brushes on which the cabbage heads ride. Thus, no barrier or drop is encountered at the end of the processing unit and the prepared vegetables are readily deposited by the pusher rod onto the delivery chute for conveyance away.

It is manifest that there has thus been produced a machine which is readily assembled of relatively few simple parts and is operable by unskilled labor in the preparation of fruits and vegetables as delivered from the field for subsequent use. The machine is adjustable to enable regulation of the amount of cleansing and stripping that takes place and means are provided to keep the working area free of substances, which might disrupt the continuity of operations. The machine is operable with hot or cold fluids and is not limited by the size of fruits and vegetables within the variations ordinarily produced.

It is apparent that the arrangement and formation of parts would suffice for the preparation of fruits and vegetables requiring only a washing and scrubbing action. By the proper selection of rollers or brushes, it is within the concept of the invention to use the machine in the preparation of fruits and vegetables from which it is desired to remove only the outer skin or fuzz.

It is to be understood that numerous changes may be made in the details of construction, arrangement and operation without departing from the spirit of the invention, especially as defined in the following claims.

What is claimed is:

1. A stripping and washing machine for headed varieties of leafy vegetables comprising a plurality of laterally spaced cylindrical brushes arranged horizontally in the form of a longitudinal trough-like bed, power means for rotating alternate pairs of brushes in opposite direction at variable speeds, a feed hopper at one end of said bed, delivery means at the other end of said bed, arm means projecting upwardly between said laterally spaced brushes into the area above said bed, means for imparting longitudinal movement to said arm means for causing said arm means to enter said area above said bed through said hopper and leave in the vicinity of said delivery means, said arm means displacing vegetables from said hopper and forcing them along said bed of brushes to said delivery means, the outer leaves of said vegetable being stripped from the head during the passage, and overhead spray means for washing said brushes and vegetables during their movement.

2. A machine as claimed in claim 1 comprising stripper plates disposed in the vicinity of the brushes to remove entangled leaves, and a shield below the bed to protect the underside of the machine and conduct the refuse to one side thereof.

ROY IRONS,
*Administrator of the Estate of Ross C. Irons, Deceased.*

REFERENCES CITED

The following references are of record in the file of this patent:

UNITED STATES PATENTS

| Number | Name | Date |
|---|---|---|
| 956,426 | Rowland et al. | Apr. 26, 1910 |
| 1,205,118 | Stebler | Nov. 14, 1916 |
| 1,399,412 | Sternard | Dec. 6, 1921 |
| 1,786,405 | Brogden | Dec. 23, 1930 |
| 2,012,655 | Bowman | Aug. 27, 1935 |
| 2,149,443 | Kennedy et al. | Mar. 7, 1939 |
| 2,249,787 | Savage | July 22, 1941 |
| 2,477,006 | Pierson | July 26, 1949 |